(12) United States Patent
Ishihara et al.

(10) Patent No.: US 7,245,557 B2
(45) Date of Patent: Jul. 17, 2007

(54) SONAR

(75) Inventors: Shinji Ishihara, Nishinomiya (JP);
Takanori Satoh, Nishinomiya (JP);
Mitsuhiro Inouchi, Nishinomiya (JP);
Osamu Kubota, Nishinomiya (JP);
Yuriko Onishi, Nishinomiya (JP)

(73) Assignee: Furuno Electric Company Limited, Nishinomiya-shi, Hyogo-ken (JP)

( * ) Notice: Subject to any disclaimer, the term of this patent is extended or adjusted under 35 U.S.C. 154(b) by 0 days.

(21) Appl. No.: 11/303,928

(22) Filed: Dec. 19, 2005

(65) Prior Publication Data

US 2006/0133210 A1    Jun. 22, 2006

(30) Foreign Application Priority Data

Dec. 20, 2004   (JP)   ............................. 2004-367084

(51) Int. Cl.
*G01S 15/00*   (2006.01)
*G01S 7/52*   (2006.01)

(52) U.S. Cl. .......................... 367/88; 367/87; 367/901

(58) Field of Classification Search ................. 367/87, 367/88, 98, 99, 901
See application file for complete search history.

(56) References Cited

U.S. PATENT DOCUMENTS 6,731,569 B2 *   5/2004   Yurchenko et al. ......... 367/138
6,870,792 B2 *   3/2005   Chiappetta .................. 367/98
2004/0179429 A1 *   9/2004   Preston ....................... 367/99

FOREIGN PATENT DOCUMENTS

| JP | 2-278180 A | 11/1990 |
| JP | 4-116488 A | 4/1992 |
| JP | 2001-108738 A | 4/2001 |

* cited by examiner

*Primary Examiner*—Ian J. Lobo
(74) *Attorney, Agent, or Firm*—Birch, Stewart, Kolasch & Birch, LLP

(57) ABSTRACT

A sonar emits an ultrasonic wave into the water from a transducer on the basis of a transmission signal outputted from a transmission circuit, receives an echo reflected in the water with the transducer and converts the echo into an electric signal, and displays underwater information on a display unit on the basis of an echo signal extracted by processing the electric signal. A tailing signal removing unit for removing a tailing signal and extracting only the echo signal is provided in the sonar such that a video of a surface layer fish shoal is clearly displayed on a screen of the display unit without being hidden by a video of the tailing signal.

8 Claims, 6 Drawing Sheets

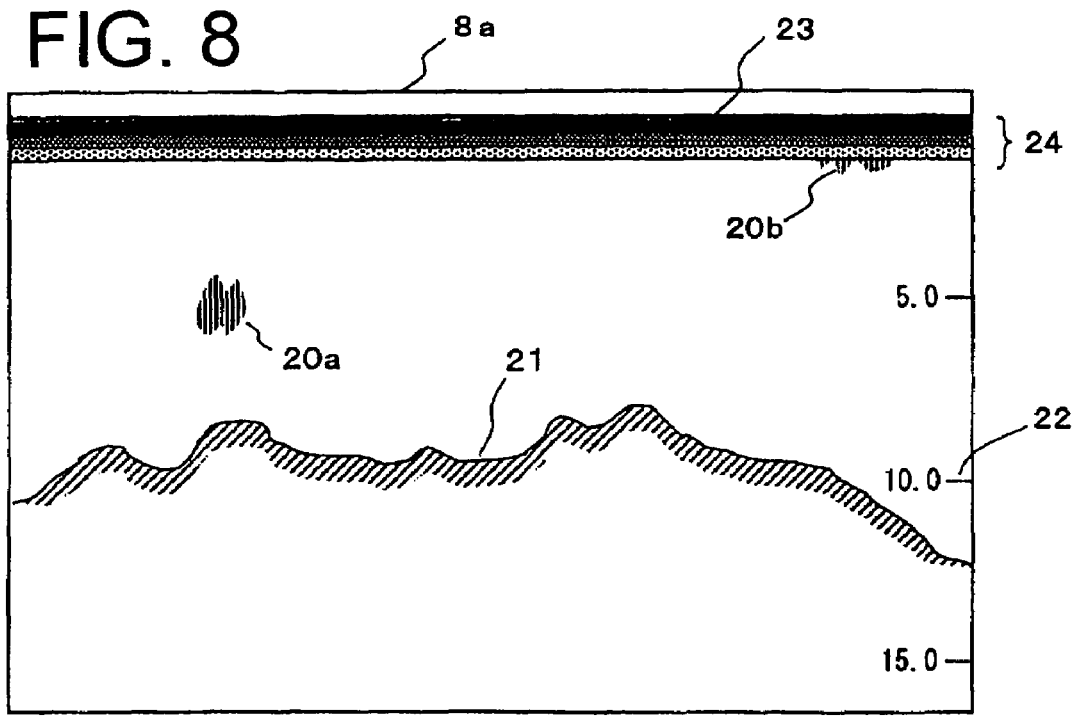

SONAR

BACKGROUND OF THE INVENTION

1. Field of the Invention

The present invention relates to sonars using ultrasonic waves such as a fish finer and an echo sounder that are mounted on a ship.

2. Description of the Related Art

A sonar is an ultrasonic apparatus that emits an ultrasonic wave from a transducer attached to a hull into the water, receives echoes of the ultrasonic wave reflected on a shoal of fish, a water bottom, and the like and returned to the sonar, and displays underwater information. For example, in the case of a fish finder, echoes from the water are distinguished by colors according to signal intensities and displayed on a display unit. As an example, strong echoes returned from a shoal of fish and a water bottom with large reflection intensities are displayed in reddish brown and a weak echo returned from a shoal of fish with a small reflection intensity is displayed in blue, green, or the like.

In such a sonar, since one transducer performs both operations of transmission and reception, an unnecessary signal like ringing appears immediately after an ultrasonic wave is transmitted. This signal is hereinafter referred to as a "tailing signal". FIGS. 7A and 7B are diagrams for explaining a tailing signal. FIG. 7A is a diagram of a signal waveform of an ultrasonic wave transmitted from the transducer. A tailing signal indicted by a broken line follows a transmission signal indicated by a solid line. The tailing signal is caused by reflection of the transmission signal in the transducer, a band-limited frequency characteristic of an element, and the like. FIG. 7B is a diagram of a signal waveform received by the transducer. Transmission and reception in the transducer are switched by a transmission/reception switching unit. However, since electric power of the transmission signal is extremely large, the transmission signal leaks to a reception circuit from the transmission/reception switching unit. Consequently, as indicated by an alternate long and short dash line in FIG. 7B, a signal of the same waveform as the transmission signal appears. A broken line indicates a tailing signal immediately after transmission of an ultrasonic wave and a solid line indicates an echo signal reflected on a target in the water.

When the tailing signal described above is generated, as shown in FIG. 8, a video 24 of the tailing signal appears on a screen 8a of the display unit 8. Reference signs 20a and 20b denote fish shoal videos. Reference numeral 21 denotes a water bottom video; 22, a water depth scale; and 23, an oscillation line indicating a transmission position of an ultrasonic wave. The video 24 of the tailing signal is a stripe-like color video consisting of three layers of, for example, reddish brown, yellow, and blue in order from above. Consequently, a video 20b of a surface layer fish shoal present near the water surface is covered with the video 24 of the tailing signal to be less easily seen. In some cases, the video 20b of the surface layer fish shoal is completely hidden and cannot be visually recognized.

As measures against this problem, it is conceivable to reduce a time width of the tailing signal and control a signal level by providing a backing material for absorbing sound waves in the transducer. However, when this method is used, the number of components and processing man-hours increase to cause an increase in cost and it is impossible to expect a significant improvement effect. On the other hand, if reception sensitivity is lowered immediately after transmission of an ultrasonic wave, the video 24 of the tailing signal is not displayed. However, the fish shoal videos 20a and 20b, which should originally be displayed, are not displayed either. Thus, this method is unrealistic.

Note that many technologies for controlling reverberation in the water immediately after transmission of an ultrasonic wave in an ultrasonic apparatus have been proposed as described in, for example, JP-A-2001-108738, JP-A-4-116488, and JP-A-2-278180. However, all of the techniques are techniques for controlling reverberant signals generated in the water and are not techniques for controlling a tailing signal caused by a transmission signal in the transducer. Specific technical contents described in the patent documents are different from a technique of the invention described later.

SUMMARY OF THE INVENTION

As described above, in the conventional sonar, a shoal of fish and the like near the water surface are not clearly displayed and underwater information cannot be accurately extracted because of a tailing signal caused immediately after transmission of an ultrasonic wave. In view of such points, it is an object of the invention to provide a sonar that can accurately display underwater information near the water surface without being affected by a tailing signal.

A tailing signal outputted from a transducer depends on a characteristic of an oscillator provided in the transducer, a structure of the transducer, a situation in which the transducer is installed in a hull, and the like. Therefore, if there is no change in a transmission signal for driving the oscillator and an external force applied to the transducer (e.g., a pressure applied to the transducer due to sailing of a ship) a tailing signal, an amplitude and a phase of which are always substantially constant every time transmission is performed of a transmission signal, is outputted. On the other hand, since possibility of a shoal of fish, a water mass, or the like in the water remaining stationary in the same positions is extremely low, an echo signal reflected on the target is a signal, an amplitude and a phase of which change at random every time transmission is performed of a transmission signal. In this way, whereas the amplitude and the phase of the tailing signal are constant, the amplitude and the phase of the echo signal is not constant. Thus, it is possible to make use of a difference of characteristics of both the signals to remove only the tailing signal from signals received by the transducer and separate and extract echoes from targets near the water surface. The invention has been devised with attention paid to such a principle.

The invention provides a sonar comprising a transmission circuit for outputting a transmission signal of a predetermined frequency, a transducer for emitting an ultrasonic wave into water in response to the transmission signal from the transmission circuit and receiving an echo reflected in the water and converting the echo into an electric signal, a tailing signal removing unit for removing a tailing signal caused by the transmission signal from the electric signal including the tailing signal and the echo signal, and a display unit for displaying the echo signal from the tailing signal removing unit.

Consequently, since it is possible to remove the tailing signal from the reception signal and extract only the echo signal, a video of the tailing signal does not appear on the display unit. Therefore, since an echo video from a target near the water surface such as a surface layer fish shoal is clearly displayed, it is possible to visually recognize an underwater video accurately.

The invention provides a sonar comprising a transmission circuit for outputting a transmission signal of a predetermined frequency, a transducer for emitting an ultrasonic wave into water in response to the transmission signal from the transmission circuit and receiving an echo reflected in the water and converting the echo into an electric signal, a reception circuit for receiving the electric signal converted by the transducer and extracting a reception signal in a predetermined frequency band, an A/D converter for sampling the reception signal extracted by the reception circuit at a fixed time interval and converting the reception signal into a digital signal, a tailing signal removing unit for removing the tailing signal included in the digital reception signal from the A/D converter, a detection circuit for applying detection processing to an echo signal outputted from the tailing signal removing unit, and a display unit for displaying the echo signal from the detection circuit.

In the embodiment, the tailing signal removing unit may include a low-pass filter and a differential arithmetic unit. The low-pass filter extracts only the tailing signal out of the tailing signal and the echo signal included in the reception signal outputted from the A/D converter. The differential arithmetic unit calculates a difference between the output of the A/D converter and the output of the low-pass filter and extracts only the echo signal.

In this case, the low-pass filter may extract only the tailing signal on the basis of present and past sampling values of the reception signal obtained by the A/D converter.

The tailing signal removing unit may include a high-pass filter instead of the low-pass filter and the differential arithmetic unit. The high-pass filer extracts only the echo signal out of the tailing signal and the echo signal included in the reception signal outputted from the A/D converter.

In this case, the high-pass filter may extract only the echo signal on the basis of present and past sampling values of the reception signal obtained by the A/D converter.

In the invention, in extracting only the echo signal, constancy of the tailing signal (meaning that an amplitude and a phase of the tailing signal do not change very time the tailing signal is transmitted) is required to be guaranteed. This is on the premise that the transmission signal is constant. Thus, in the embodiment of the invention, when a transmission condition for the transmission signal changes, a past sampling value is initialized. Initialization means replacement of the past sampling value with a first sampling value after the change of the transmission condition. This makes it possible to minimize a transient response time. The transmission condition changes, for example, when a transmission pulse width changes or a transmission output changes according to switching of a detection range or when a transmission waveform changes because a modulation system is switched.

In the case of a sonar having a beam stabilize function for automatically adjusting a directional pattern of a beam by controlling a phase of a transmission signal according to swing of a hull, a waveform of the transmission signal changes every time according to the swing of the hull. In the embodiment of the invention, past sampling values used in the low-pass filter or the high-pass filter are accumulated in association with swing angles of the hull and, when the hull swings, a tailing signal is removed and only an echo signal is extracted on the basis of sampling values corresponding to the swing angles. This makes it possible to remove the tailing signal and surely extract only the echo signal even if the hull swings.

BRIEF DESCRIPTION OF THE DRAWINGS

In the accompanying drawings:

FIG. 8 is a diagram of an example of underwater information displayed on a display unit of a conventional fish finder.

DETAILED DESCRIPTION OF THE INVENTION

Figure 1:
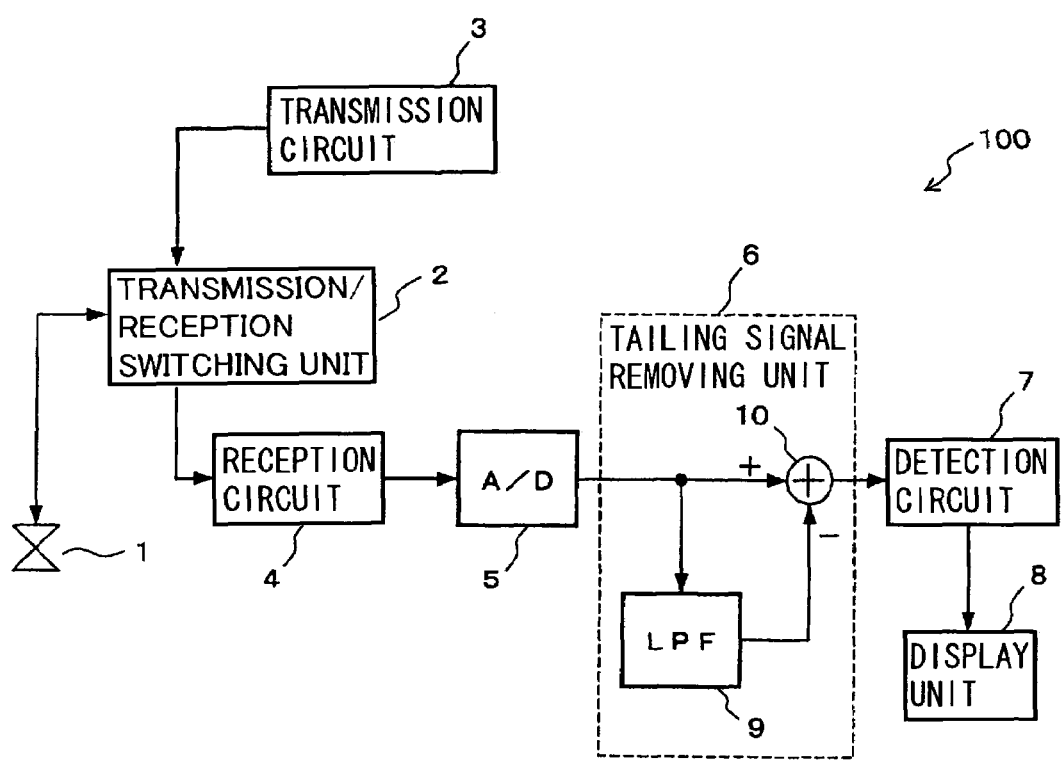
FIG. 1 is a block diagram of a fish finder that is an embodiment of the invention.

FIG. 1 is a block diagram of a fish finder 100 that is an embodiment of a sonar according to the invention. Reference numeral 1 denotes a transducer that emits an ultrasonic wave into the water and receives an echo reflected in the water and converts the echo into an electric signal; 2, a transmission/reception switching unit that switches an operation of the transducer 1 to transmission and reception; 3, a transmission circuit that outputs a transmission signal of a predetermined frequency to the transducer 1; and 4, a reception circuit that receives the electric signal converted by the transducer 1 and extracts a reception signal in a predetermined frequency band. Reference numeral 5 denotes an A/D converter that samples the reception signal extracted by the reception circuit 4 at a fixed time interval and converts the reception signal into a digital signal; 6, a tailing signal removing unit that removes a tailing signal included in the reception signal subjected to digital conversion by the A/D converter 5; 7, a detection circuit that applies detection processing to an echo signal outputted from the tailing signal removing unit 6; and 8, a display unit that displays underwater information on the basis of an output signal of the detection circuit 7. The reception circuit 4, the A/D converter 5, the tailing signal removing unit 6, and the detection circuit 7 constitute a signal processing circuit.

The tailing signal removing unit 6 is a characteristic part of the invention. The tailing signal removing unit 6 includes a low-pass filter 9 and a differential arithmetic unit 10. The low-pass filter 9 consists of, for example, a Finite Impulse Response (FIR) filter. The low-pass filter 9 extracts only the tailing signal out of the tailing signal and the echo signal included in the reception signal outputted from the A/D converter 5. The differential arithmetic unit 10 calculates a difference between the output of the A/D converter 5 and the output of the low-pass filter 9 and extracts only the echo signal.

Figure 2:
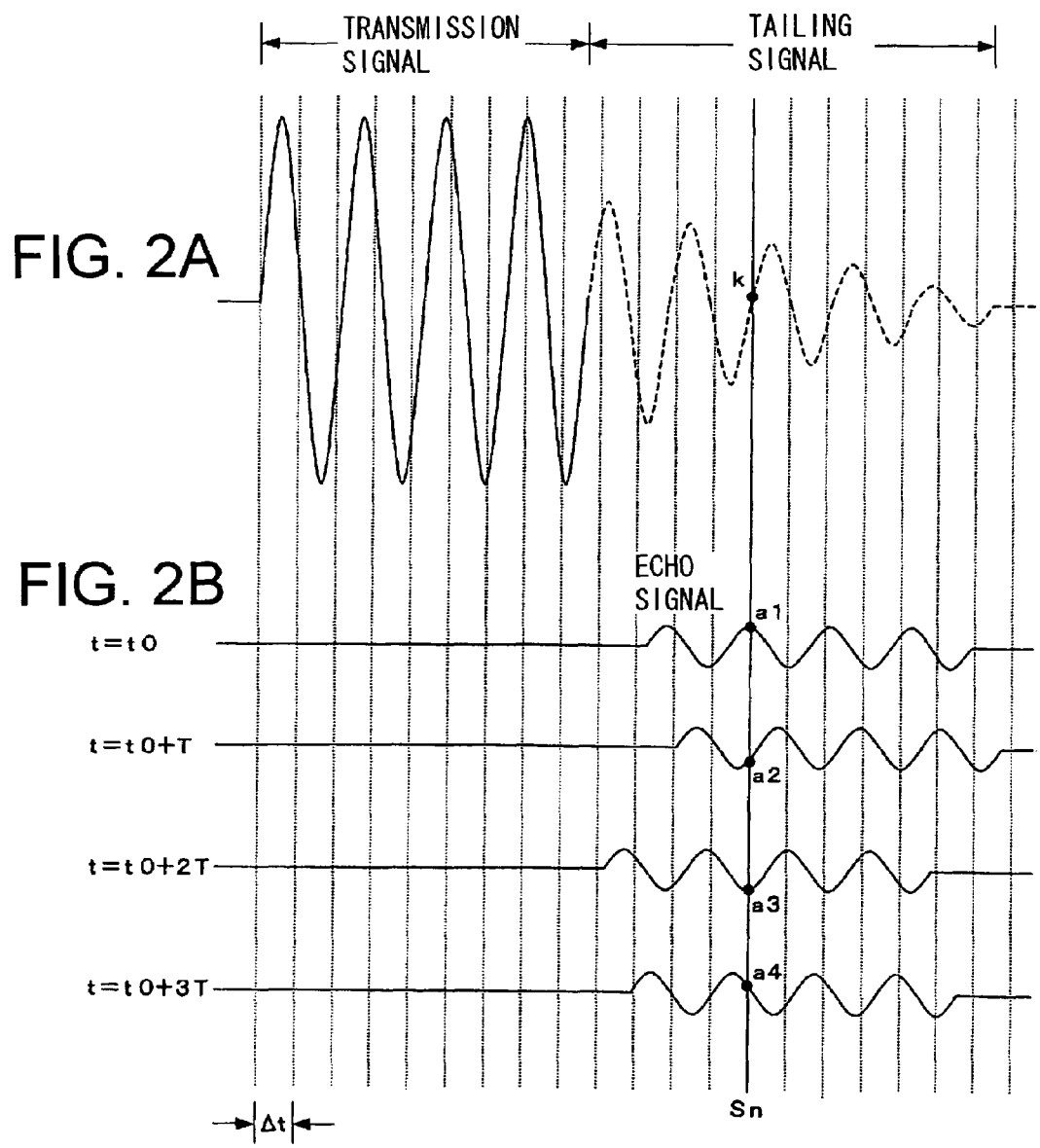
FIGS. 2A and 2B are diagrams showing waveforms of signals inputted to a reception circuit.

FIGS. 2A and 2B are diagrams showing waveforms of signals inputted to the reception circuit 4. FIG. 2A shows waveforms of a transmission signal (a leak signal) received from the transmission circuit 3 thorough the transmission/reception switching unit 2 and a tailing signal following the transmission signal. FIG. 2B shows waveforms of an echo signal reflected in the water. Actually, an electric signal inputted to the reception circuit 4 is an electric signal in which the signals in FIGS. 2A and 2B are combined. However, for convenience of explanation, the echo signal is shown as being separated from the transmission signal and the tailing signal.

As described above, if the transmission signal is constant and there is no change in an external force applied to the transducer 1, an amplitude and a phase of the tailing signal shown in FIG. 2A are substantially constant every time transmission is performed. In other words, when a transmission signal of the same waveform is given to the transducer 1 from the transmission circuit 3 at a predetermined period, a tailing signal caused by the transmission signal is a stationary signal having an amplitude and a phase shown in FIG. 2A every time. On the other hand, since a shoal of fish and the like in the water irregularly move, an amplitude and a phase of the echo signal shown in FIG. 2B change at random every time transmission is performed of the transmission signal. In the figure, waveforms of the echo signal at t=t0, t=t0+T, t=t0+2T, and t=t0+3T are shown. T is a transmission period of the transmission signal.

Operations of the fish finder 100 in FIG. 1 will be explained. When a transmission signal of a predetermined frequency outputted from the transmission circuit 3 is given to the transducer 1 via the transmission/reception switching unit 2, an oscillator (not shown) of the transducer 1 is driven and an ultrasonic wave is emitted into the water. The ultrasonic wave emitted is reflected on a target such as a shoal of fish or a water bottom and received by the transducer 1 as an echo. The transducer 1 converts the echo received into an electric signal and outputs the electric signal to the reception circuit 4 via the transmission/reception switching unit 2. As described above, the transmission signal and the tailing signal in FIG. 2A and the echo signal in FIG. 2B are included in the signal inputted to the reception circuit 4. The reception circuit 4 amplifies the inputted signal and extracts a signal in a predetermined frequency band. A reception signal outputted from the reception circuit 4 is given to the A/D converter 5.

The A/D converter 5 samples the output signal of the reception circuit 4 at a fixed time interval in synchronization with the transmission signal and converts the output signal into a digital signal (quantizes the output signal). Δt in FIGS. 2A and 2B indicates a sampling interval. The reception signal subjected to digital conversion by the A/D converter 5 is inputted to the tailing signal removing unit 6. In the tailing signal removing unit 6, the tailing signal is removed according to processing described below.

Figure 3:
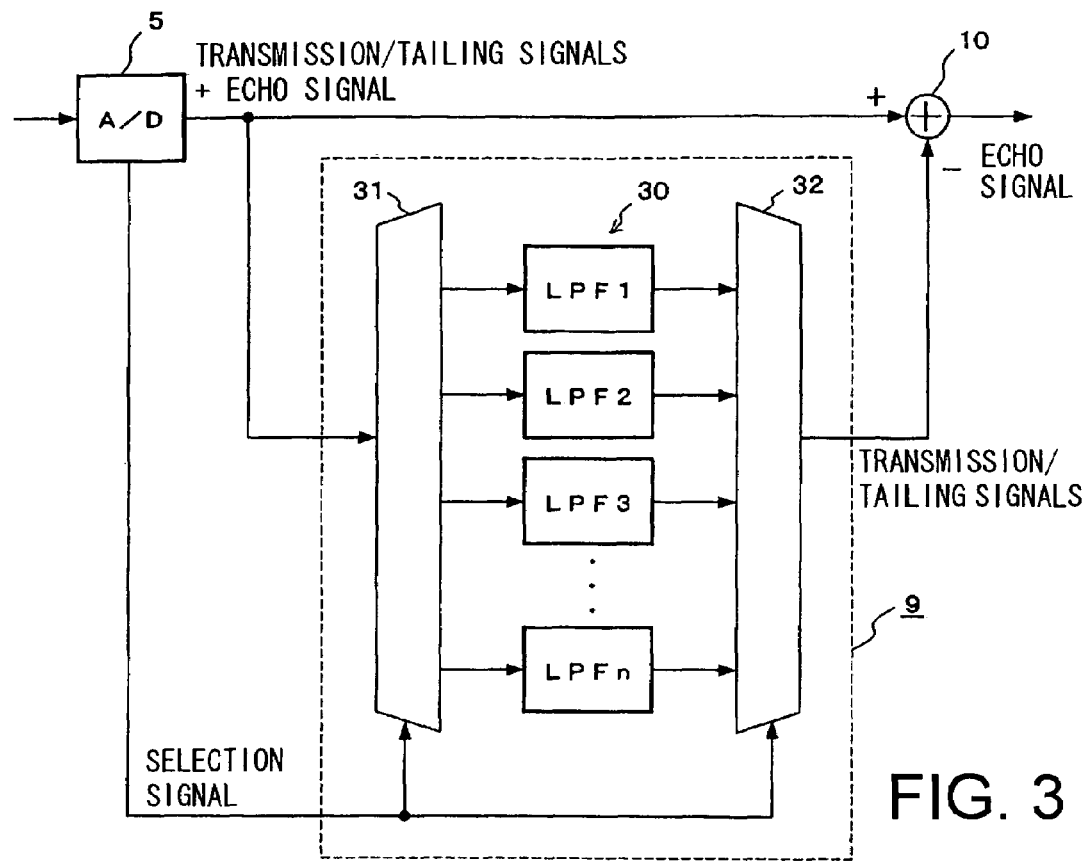
FIG. 3 is a block diagram showing a specific constitution of a low-pass filter.

The reception signal inputted to the tailing signal removing unit 6 is inputted to the low-pass filter 9 and is also inputted to the differential arithmetic unit 10. The low-pass filter 9 performs filter processing independently for each sampling data (amplitude value) at each of sampling points. FIG. 3 shows a specific constitution of the low-pass filter 9. Reference numeral 30 denotes plural filter elements provided in association with the sampling points and 31 and 32 denote selection circuits for selecting one of the plural filter elements 30. Sampling data of the transmission signal, the tailing signal, and the echo signal are given to the filter element 30 selected in association with a sampling point in the selection circuit 31. The filter element 30 calculates a moving average from present and past sampling values for the sampling point.

In this case, since an amplitude and a phase of the echo signal change at random every time transmission is performed, a value of a moving average at each of the sampling points converges to 0. On the other hand, since amplitudes and phases of the transmission signal and the tailing signal do not change every time transmission is performed, a moving average at each of the sampling points is an infinite value. For example, at a sampling point Sn shown in FIGS. 2A and 2B, an amplitude (a sampling value) of the echo signal changes from a1 to, a2, a3, and a4 every time transmission is performed. In the figures, for convenience of explanation, only four sampling values are shown. However, since a large number of sampling values are obtained, when a moving average is calculated using the sampling values, a value of the moving average is about 0. On the other hand, at the sampling point Sn, an amplitude (a sampling value) of the tailing signal does not change every time transmission is performed and takes a fixed value k. Thus, a moving average of the tailing signal at the sampling point Sn is always k.

As described above, when a value of a moving average at each of the sampling points is calculated, a moving average of the echo signal is about 0. Thus, in the low-pass filter 9, the echo signal is removed and only the transmission signal and the tailing signal are extracted. The transmission signal and the tailing signal extracted by the low-pass filter 9 are given to the differential arithmetic unit 10. On the other hand, an output of the A/D converter 5 is given to the differential arithmetic unit 10 without the intervention of the low-pass filter 9. The echo signal is included in the output other than the transmission signal and the tailing signal. The differential arithmetic unit 10 performs a difference arithmetic operation for deducting the output of the low-pass filter 9 from the output of the A/D converter 5. According to the arithmetic operation, both the transmission signal and the tailing signal are removed and only the echo signal is extracted from the differential arithmetic unit 10.

The echo signal separated from the tailing signal and extracted in this way is given to the detection circuit 7. In the detection circuit 7, envelope data of the echo signal is extracted according to publicly-known detection processing. An output of the detection circuit 7 is sent to the display unit 8. Underwater information such as a fish shoal video based on the echo signal is displayed on the display unit 8 in a color corresponding to a signal intensity.

Figure 4:
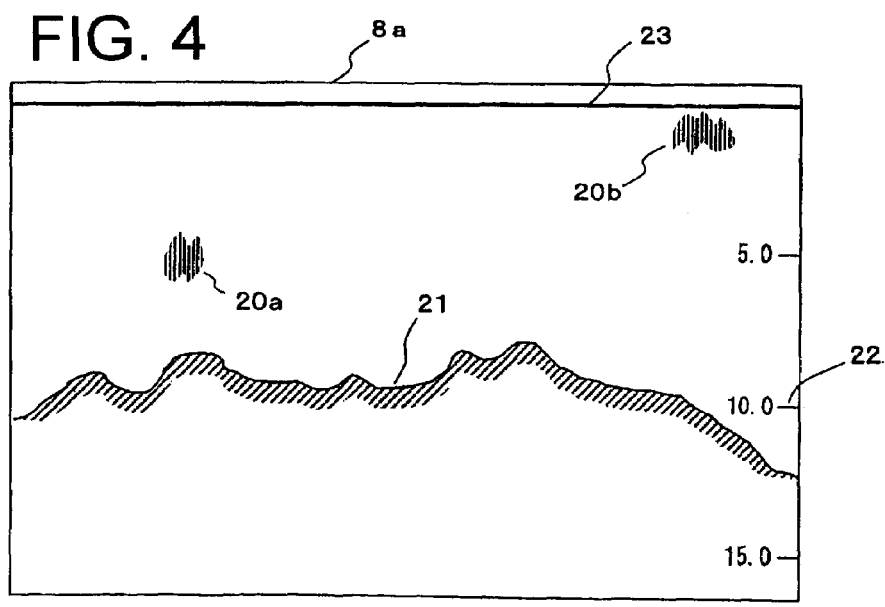
FIG. 4 is a diagram of an example of underwater information displayed on a display unit.

FIG. 4 shows an example of underwater information displayed on the screen 8a of the display unit 8. Reference signs 20a and 20b denote fish shoal videos based on echoes reflected on shoals of fish. Reference numeral 21 denotes a water bottom video based on an echo reflected on a water bottom; 22, a water depth scale; 23, an oscillation line indicting a transmission position of an ultrasonic wave. As described above, in the case of the invention, since a tailing signal is removed in the tailing signal removing unit 6, the video 24 of the tailing signal in FIG. 8 does not appear in FIG. 4. Therefore, the video 20b of a surface layer fish shoal near the water surface is clearly displayed and it is possible to visually recognize an underwater video accurately. Since it is possible to effectively remove the tailing signal even if the backing material is not provided in the transducer 1, it is possible to control an increase in cost.

Note that, when an echo signal from the water has constancy (when an amplitude and a phase of the echo signal do not change every time transmission is performed), the echo signal is removed together with the tailing signal in the differential arithmetic unit 10 according to the principle described above. The fish shoal videos 20a and 20b are not displayed. However, usually, it is less likely that single fish stands still in a fixed position in an ultrasonic beam area. In addition, an echo from the water is a set of reflection signals from countless fine scatterers in a reverberant volume. Unless the transducer 1 stands still in a negligible degree with respect to a wavelength, a phase of the echo signal fluctuates at random every time transmission is performed. Therefore, actually, a situation in which a necessary echo signal is removed without being extracted rarely occurs.

As a condition for removing the tailing signal and extracting only the echo signal in the tailing signal removing unit 6, an amplitude and a phase of the tailing signal do not change every time transmission is performed. Since past sampling values are used in the calculation of a moving average, when a transmission condition for the transmission signal changes, it is necessary to initialize past data. According to the initialization, the past sampling values are replaced with a first sampling value after the change of the transmission condition. In a simple example, it is assumed that past sampling values (signal levels) at three points stored in the memory before the transmission condition changes are 100, 105, and 98 and a sampling value (a signal level) of a stationary signal after the transmission condition changes is 50. In this case, if initialization is not performed, a moving average is calculated in the low-pass filter 9 as described below.

First time: (50+100+105+98)/4=88.25     (1)

Second time: (50+50+100+105)/4=76.25     (2)

Third time: (50+50+50+100)/4=62.5     (3)

Fourth time: (50+50+50+50)/4=50     (4)

This means that the moving average reaches the value of the stationary signal at last by the calculation in the fourth time. However, when initialization is performed after the transmission condition changes, all the past sampling values 100, 105, and 98 are replaced with the sampling value 50 after the change of the transmission condition. Thus, a result of the calculation in (4) is obtained by the calculation in the first time. Therefore, it is possible to minimize a transient response time. The transmission condition changes, for example, when a transmission pulse width changes or a transmission output changes according to switching of a detection range or when a transmission waveform changes because a modulation system is switched.

It is also possible to apply the invention to a sonar having a beam stabilize function. Beam stabilize is a function for automatically adjusting a directional pattern of a beam by controlling a phase of a transmission signal according to a swing angle of a hull detected by a swing sensor. In the sonar having the function, a waveform of a transmission signal changes according to swing of the hull every time transmission is performed. Thus, as an embodiment of the invention, it is conceivable to adopt a system for accumulating past sampling values used in the low-pass filter 9 in storing means such as a memory in association with swing angles of the hull and, when the hull swings, calculating moving averages of a tailing signal and an echo signal using a sampling value corresponding to a swing angle detected by the swing sensor. Consequently, since the same sampling value is always used for the same swing angle, it is possible to accurately calculate a moving average even if the hull swings. As a result, it is possible to remove the tailing signal and surely extract only the echo signal. Note that, if data is accumulated in association with all swing angles, an enormous capacity of the memory is required. Thus, it is possible to save a capacity of the memory by giving a fixed width to swing angles and setting one sampling value for, for example, every 5 degrees. It is also possible to reduce a data storage capacity by using an Infinite Impulse Response (IIR) filter, an impulse response of which is infinite, as the low-pass filter 9.

Figure 5:
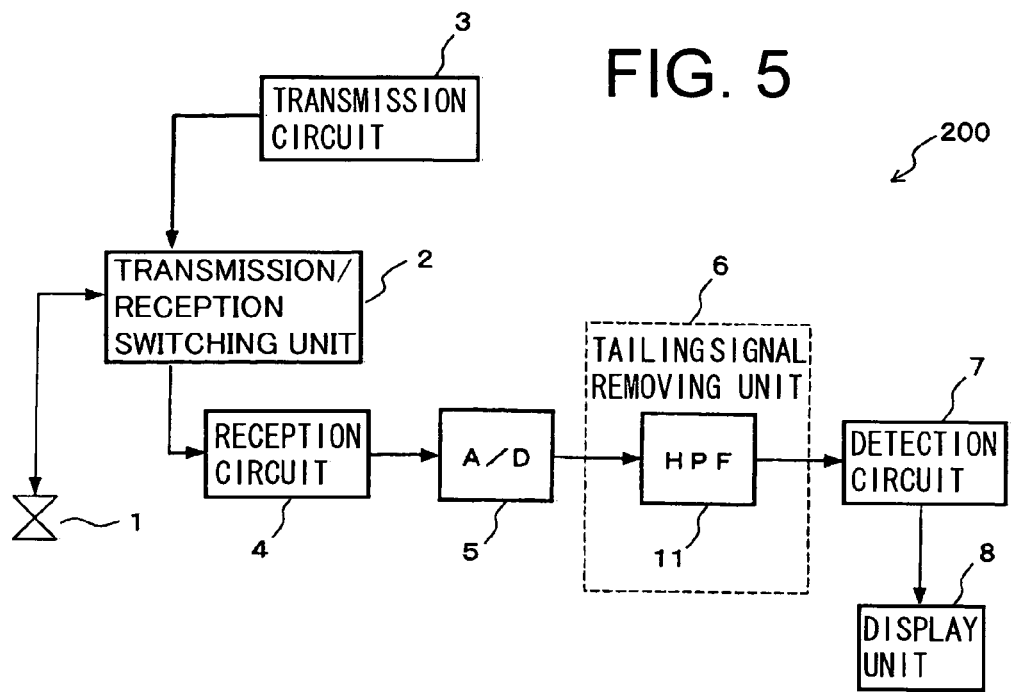
FIG. 5 is a block diagram of a fish finder according to another embodiment of the invention.

FIG. 5 is a block diagram of a fish finder 200 according to another embodiment of the invention. In the figure, components identical with those in FIG. 1 are denoted by the identical reference numerals. In this embodiment, the tailing signal removing unit 6 includes a high-pass filter 11 instead of the low-pass filter 9 and the differential arithmetic unit 10 in FIG. 1. The other components are the same as those in FIG. 1. In the case of FIG. 1, a signal with an echo signal removed is outputted from the low-pass filter 9 and the echo signal is extracted by deducting the output from an original signal in the differential arithmetic unit 10. In the case of FIG. 5, the high-pass filter 11 removes stationary transmission signal and tailing signal and directly outputs an echo signal. Even when the tailing signal removing unit 6 includes the high-pass filter 11 in this way, it is possible to remove the tailing signal and extract only the echo signal.

Figure 6:
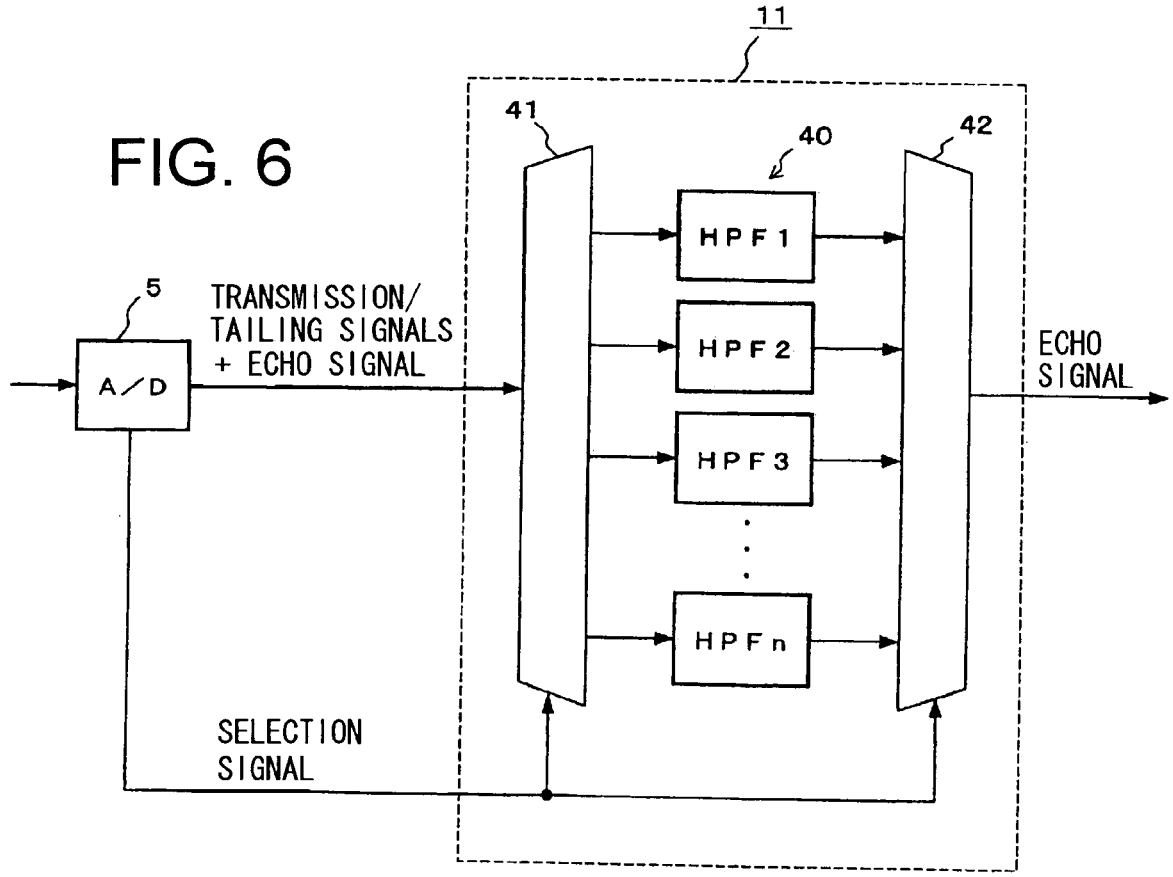
FIG. 6 is a block diagram showing a specific constitution of a high-pass filter.
Figure 7A:
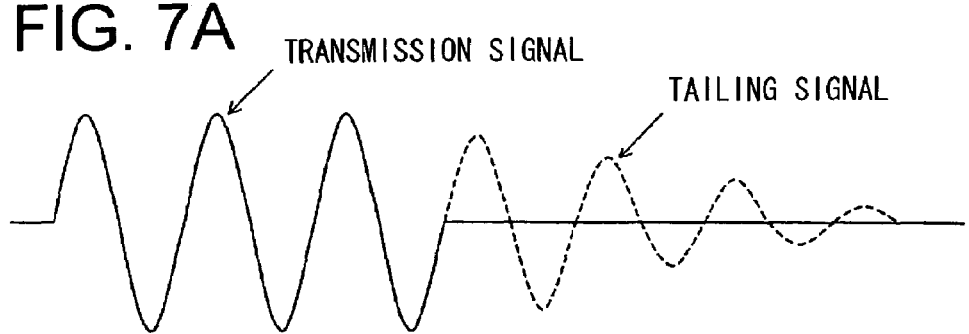
FIGS. 7A and 7B are diagrams for explaining a tailing signal.
Figure 7B:
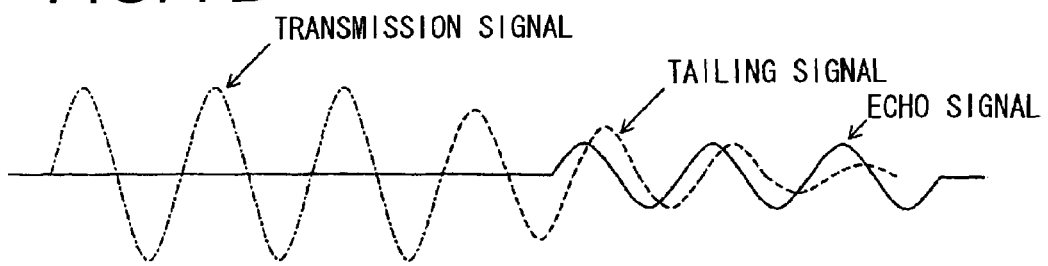

FIG. 6 shows a specific structure of the high-pass filter 11. Reference numeral 40 denotes plural filter elements provided in association with sampling points and 41 and 42 denote selection circuits for selecting one of the plural filter elements 40. The high-pass filter 11 performs independent filter processing by the filter element 40 for each data at each of the sampling points.

In the embodiments described above, moving averages of a tailing signal and an echo signal are calculated, respectively (all filter coefficients in this case are 1), and the tailing signal and the echo signal are separated on the basis of a result of the calculation. However, in extracting the tailing signal using the moving average, the tailing signal is extracted on the premise that there is no fluctuation component in the tailing signal. It is difficult to extract the tailing signal completely if there is a fluctuation component in the tailing signal. In this case, it is sufficient to, regardless of the moving average, change a cut-off frequency using an FIR filter or an IIR filter to which an appropriate filter coefficient is given and extract a tailing signal (a low-frequency signal) from a signal in which the tailing signal and other signals (high-frequency signals) are mixed.

In the embodiments described above, the invention is applied to the fish finder as an example. It is possible to apply the invention to various sonars such as an echo sounder, a PPI sonar, a scanning sonar, a current meter, a Doppler log, a Doppler sonar, and a net recorder other than the fish finder. For example, in the echo sounder, even in a shallow area in which a distance to a water bottom immediately below a ship bottom is short, it is possible to accurately measure and display water depth information without being affected by a tailing signal. In the current meter, it is possible to accurately measure and display a tidal current in a surface layer without being affected by a tailing signal.

According to the invention, it is possible to provide a sonar that can accurately display underwater information near the water surface without being affected by a tailing signal. Since it is unnecessary to provide an extra member such as a backing material in a transducer, there is an advantage that it is possible to realize the sonar at low cost.

What is claimed is:
1. A sonar comprising:
a transmission circuit for outputting a transmission signal of a predetermined frequency;
a transducer for emitting an ultrasonic wave into water in response to the transmission signal from the transmis- sion circuit and receiving an echo reflected in the water and converting the echo into an electric signal;

a reception circuit for receiving the electric signal converted by the transducer and extracting a reception signal in a predetermined freciuency band;

an A/D converter for sampling the reception signal extracted by the reception circuit at a fixed time interval and converting the reception signal into a digital signal;

a tailing signal removing unit for removing the tailing signal included in the digital reception signal from the A/D converter;

a detection circuit for applying detection processing to an echo signal outputted from the tailing signal removing unit; and a display unit for displaying the echo signal from the detection circuit, wherein the tailing signal removing unit comprises;

a low-pass filter for extracting only the tailing signal out of the tailing signal and the echo signal included in the reception signal outputted from the A/D converter; and a differential arithmetic unit for calculating a difference between the output of the A/D converter and the output of the low-pass filter and extracting only the echo signal.

2. A sonar according to claim 1, wherein the low-pass filter extracts only the tailing signal on the basis of present and past sampling values of the reception signal obtained by the A/D converter.

3. A sonar according to claim 2, wherein the sonar initializes, when a transmission condition for the transmission signal changes, the past sampling values.

4. A sonar according to claim 2, wherein the sonar accumulates past sampling values used in the low-pass filter in association with swing angles of a hull and, when the hull swings, removes a tailing signal and extracts only an echo signal on the basis of sampling values corresponding to the swing angles.

5. A sonar comprising:

a transmission circuit for outputting a transmission signal of a predetermined frequency;

a transducer for emitting an ultrasonic wave into water in response to the transmission signal from the transmission circuit and receiving an echo reflected in the water and converting the echo into an electric signal;

a reception circuit for receiving the electric signal converted by the transducer and extracting a reception signal in a predetermined frequency band;

an A/D converter for sampling the reception signal extracted by the reception circuit at a fixed time interval and converting the reception signal into a digital signal;

a tailing signal removing unit for removing the tailing signal included in the digital reception signal from the A/D converter;

a detection circuit for applying detection processing to an echo signal outputted from the tailing signal removing unit; and a display unit for displaying the echo signal from the detection circuit, wherein the tailing signal removing unit comprises a high-pass filter for extracting only the echo signal out of the tailing signal and the echo signal included in the reception signal outputted from the A/D converter.

6. A sonar according to claim 5, wherein the high-pass filter extracts only the echo signal on the basis of present and past sampling values of the reception signal obtained by the A/D converter.

7. A sonar according to claim 6, wherein the sonar initializes, when a transmission condition for the transmission signal changes, the past sampling values.

8. A sonar according to claim 6, wherein the sonar accumulates past sampling values used in the high-pass filter in association with swing angles of a hull and, when the hull swings, removes a tailing signal and extracts only an echo signal on the basis of sampling values corresponding to the swing angles.

* * * * *